June 11, 1935.  H. C. HARVEY  2,004,723
COMPOSITE FLOORING MATERIAL
Filed Aug. 4, 1934
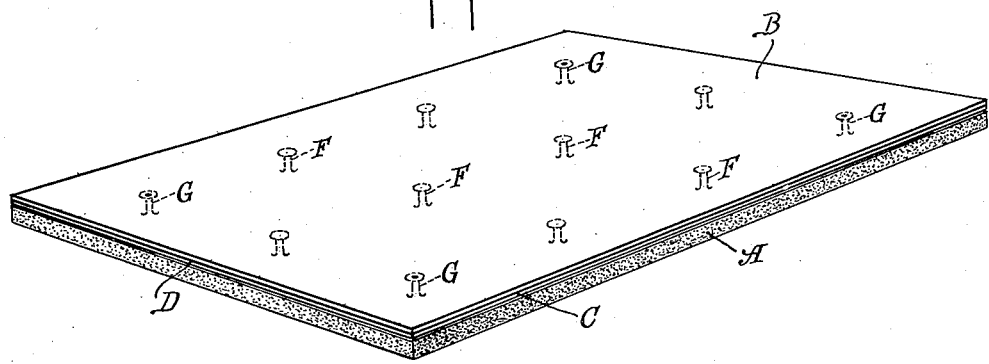
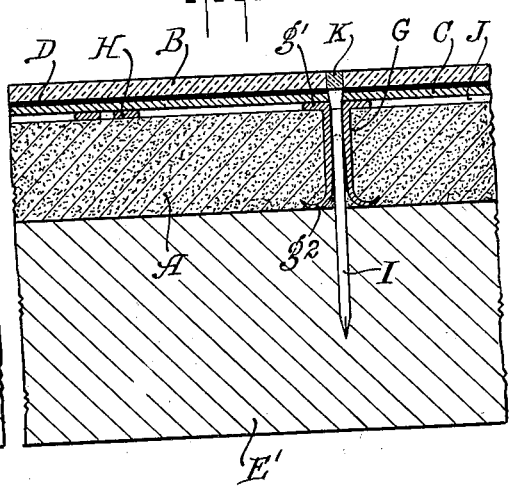
WITNESS
INVENTOR
HAROLD C. HARVEY
BY
ATTORNEYS Patented June 11, 1935

2,004,723

UNITED STATES PATENT OFFICE 2,004,723

COMPOSITE FLOORING MATERIAL

Harold C. Harvey, Trenton, N. J.

Application August 4, 1934, Serial No. 738,446

4 Claims. (Cl. 154—49)

My invention relates to a composite flooring material consisting of an aggregate in the form of a large unit sheet of a substantially rigid base board of a fibrous material having resiliency and high heat and sound insulating characteristics upon which is superimposed in spaced relation a relatively hard and highly resilient material upon which in turn is superimposed a comparatively thin sheet of an impervious covering material such as rubber, the base board, intermediate sheet and covering sheet being suitably united.

One of the objects of my invention is to provide a large unit sheet of a composite flooring material having strength and rigidity, the composite flooring material being adapted to be laid in place to constitute a floor body having a finished surface and adapted also to support comparatively heavy furniture, such as desks or bureaus, without being permanently marked, at least to any substantial degree, by the deformation of the base board. My invention is, however, not limited to a composite flooring material assembled prior to its application to the floor as the sheets may be assembled in whole or in part as they are applied to the floor.

The fibrous material constituting the rigid base or base board of my composite flooring material is preferably of, but not limited to, the type known in the art as "pulp board". Such pulp board is usually made by running paper pulp, wood pulp or the like into a mold and by means of pressure or otherwise removing the majority of the water (see, for instance, United States Letters Patent No. 971,936, dated October 4, 1910, and No. 1,272,566, dated July 16, 1919), and subsequently drying out the remainder of the water by application of heat, preferably in a suitably constructed drier. When pulp board has been produced in this manner, especially when a suitable binder has been incorporated therein, it is a commercial article (except possibly for subsequent shaping or surfacing operations) such as has been known in the market for many years. The board may be of fireproof composition, for instance, as disclosed in United States Letters Patent to Hubert L. Becher, No. 1,907,711, dated May 1, 1933.

The impervious covering material to be applied to the fibre board hereinabove described in attaining the objects of my invention is preferably a sheet of rubber, thin as compared to the thickness of the base board, the thickness of the two elements being preferably, but not necessarily, in the ration of 8:1 so that, for instance, if the base board is one-half an inch thick, the sheet of rubber or other covering material employed in connection therewith is one-sixteenth of an inch in thickness. This ratio of rubber to base board which may, of course, be varied within wide limits and is herein given by way of illustration rather than by way of limitation, serves not only to reduce the weight of the composite flooring material but also to effect a substantial saving in the cost of manufacture thereof, the usual rubber flooring material being of substantially greater thickness than the rubber portion of my composite material, for instance, one-fourth of an inch. Between the base board and the impervious covering material is placed an intermediate sheet which is of such a character that it is hard enough to resist substantial deformation when a heavy weight, such as a desk or bureau, is placed upon it and is sufficiently elastic to resume its original form and thus to raise back into substantially its original condition any depressed portion of the impervious covering material (rubber). This intermediate sheet is preferably made of thin steel which should have such qualities of springiness and resilience with substantial absence of ductility that it will not be permanently indented or otherwise deformed when a weight is placed upon it and will resume its original position when the weight is removed. The sheet may be composed of tempered steel and should be as thin as commercially practicable; I have found a steel sheet of 26 gauge or about .018 inch thickness to be suitable for average purposes. The particular thickness and quality of the steel will depend, of course, upon the weights to which the flooring is to be subjected and the distance between the supports provided for it in the manner hereinafter described.

In the accompanying drawing, in which is shown by way of illustration but not of limitation an embodiment of my novel composite flooring material, Fig. 1 is a perspective view of a large unit sheet of one form of my material having indicated thereon in dotted lines suitable devices for attaching the intermediate sheet to the base board while at the same time permanently spacing the two sheets from one another; Fig. 2 is a vertical section on an enlarged scale through the unit sheet shown in Fig. 1 and illustrating one form of the attaching device; and Fig. 3 is a vertical section on an enlarged scale through the unit sheet shown in Fig. 1 and illustrating another form of attaching device.

In such drawing, A is a substantially rigid base board of fibrous material and B a comparatively thin sheet of rubber of the same lateral dimensions as the base board. The intermediate sheet made of steel of the characteristics described is indicated by C.

The sheet B is attached to sheet C by means of a suitable cementitious compound D. In Fig. 2, E indicates the floor material, for instance, wood or cement, to which my composite flooring may be applied. In Fig. 3, E' indicates a wooden flooring.

In Fig. 2, F indicates a rivet provided with head f1 and a split shank f2. In Fig. 3, G indicates a perforated rivet composed of apertured head g1 and apertured shank g2 and H indicates a perforated washer acting as a spacing element. I represents a nail, preferably of the headless type, the upper end of which is, however, tapered so that the nail may be wedged tightly into the steel sheet after it has been driven home. J indicates the intermediate air space between the base board and the steel sheet.

The base board may be connected to the cemented steel and rubber sheets as follows: After the rivets F and/or G have been attached to the steel sheet, the base board is laid thereon and is then subjected to a pressing or hammering operation to drive the rivets through the base board. The ends of the split shanks are then struck up to bite into the base board as shown in Figs. 2 and 3 to hold such board to the steel sheet.

If my composite flooring is assembled in the factory or otherwise prior to being applied to the floor, the heads f1 and g1 and preferably also the washers H are secured, as by welding or otherwise, to the intermediate steel sheet. At least part of the rivets should be secured to the steel sheet so as to prevent displacement of such sheet relatively to the base board.

The heads f1 and g1 and the washer H act as means to space the steel sheet from the base board for reasons hereinafter described. The rivets F and G when attached to the intermediate steel sheet serve to secure such sheet permanently to the base board.

In the construction of my sheet, I may employ only rivets of the type shown at F or only rivets of the type shown at G but I prefer to use the former wherever possible because, being imperforate, they are less expensive to manufacture and are stronger. When the flooring is to be attached permanently to a wooden floor, nails will have to be used and then I prefer to employ at least some of the rivets of the perforated type shown at G because nails may be conveniently driven through them. If it is desired to drive nails through the composite flooring near the edges thereof, this may be done at any suitable place, but care should be taken not to drive the nail down so far as to strain the steel sheet and thereby permanently bend such sheet. In order to assure the proper relation of the nails when finally in place, I may use perforated washers such as H through which the nails are driven.

The depth of the spacing means, and hence of the air space J, should preferably be no more than about $\frac{1}{16}$ inch, while for most purposes the spacing means may be spaced about 12 inches from each other.

Obviously wherever a nail is used in connection with a perforated washer H or a perforated rivet G, the importance of welding or otherwise additionally securing the spacing member to the steel sheet is diminished; nevertheless in order to insure proper spacing of the attaching means and thus obtain a uniform product, I prefer to attach all of such spacing means in place before my flooring is applied.

Wherever a nail such as of the type which I have described is driven through the steel sheet it should be driven down far enough to have its upper end lie below the impervious covering material. The aperture so produced in such covering material, or created before the nail is applied, should be filled up, for instance, in the case of rubber, by means of a suitably colored self-vulcanizing cement, as indicated at K.

If the composite flooring section is to be affixed to a wooden floor by nailing, it is preferably so assembled that the impervious outer layer (e. g. rubber) remains uncemented at the edges for about two inches; along such two inch strip the flooring section is provided with hollow rivets G and/or perforated washers H through which nails may be driven to anchor the composite flooring to a wooden floor. Moreover, wherever the hollow rivets or washers are attached, or loose perforated washers are to be positioned, it is preferable to punch or drill the nail-receiving apertures at such places before the rivets or washers are attached to the sheet, or before the washers are inserted between the steel sheet and the base board, to assist the workmen in properly positioning the nails. The unattached rubber edge portions may then be cemented to the steel sheet, the cement serving also to fill any cavities produced by the driving in of the nails so far that their heads are not flush with but lie below the surface of the steel sheet. The use of filler plugs is thus avoided, and the nail heads are concealed.

By spacing the intermediate sheet from the base board, I obtain several important advantages. One of them is that deformation of the relatively weak base board material by a weight placed upon the flooring is substantially prevented, or if any takes place, it will not affect the outer appearance of the flooring, as the rubber sheet springs back into its original condition with the steel sheet. The main advantage, however, is the provision of an intermediate space filled with air within which air may circulate and also act as a cushion. When the floor is walked upon, the steel sheet is depressed, the result being that air is driven out at the edges of the flooring, and when the pressure is removed air is drawn in from the edge of the flooring, the result being a bellows action operating to effect circulation of air which carries away any moisture which may have been absorbed by the base board. This is a matter of particular importance when a cellar floor or any other floor subjected to moisture is covered with my flooring material. As it is substantially impossible to prevent moisture from being absorbed by the usual type of more or less porous backing which must be employed when rubber or linoleum is used as the surface for the flooring, such moisture eventually causing decay and objectionable odors, the circulation of air accomplished by my improved flooring structure makes it practicable to provide even damp floors with a rubber or similar surfacing.

Although I have shown and described certain specific embodiments of my invention, I am fully aware that many modifications thereof are possible and my invention is therefore not to be restricted to the embodiments shown and described. For example, other types of fastening means may be employed and different modes of attachment, such as clamping, may be utilized.

Also, other hard and resilient sheets may be used in place of steel, such as vulcanized fiber.

I claim:

1. A composite flooring material comprising a substantially rigid base board of fibrous material having resiliency and high heat and sound insulating characteristics, said base board being of substantial thickness, a comparatively thin sheet of an impervious covering material, an intermediate sheet having a high degree of resiliency and a low degree of ductility, and spacing means between such intermediate sheet and the base board providing air spaces therebetween, such spacing means being of such number and of such vertical (and horizontal) dimensions as to permit the intermediate sheet to be depressed until it receives support from the base board when the average weight to which the flooring has to be subjected is placed thereupon.

2. A composite flooring material comprising a substantially rigid base board of fibrous material having resiliency and high heat and sound insulating characteristics, said base board being of substantial thickness, a comparatively thin sheet of an impervious covering material, an intermediate sheet having a high degree of resiliency and a low degree of ductility, and individually spaced spacing means between such intermediate sheet and the base board substantially as and for the purpose described.

3. A composite flooring material as set forth in claim 1, wherein the intermediate sheet is made of steel.

4. A composite flooring material as set forth in claim 1, wherein the intermediate sheet is made of spring steel.

HAROLD C. HARVEY.